United States Patent [19]

Luo

[11] 4,054,330
[45] Oct. 18, 1977

[54] SUSPENSION SYSTEM FOR USE WITH HIGH SPEED PRINTERS

[75] Inventor: Zong S. Luo, Longmont, Colo.

[73] Assignee: Hewlett-Packard Company, Palo Alto, Calif.

[21] Appl. No.: 606,693

[22] Filed: Aug. 21, 1975

[51] Int. Cl.² ............ F16C 29/02; 308 3 A;3.6;3.9;37
[52] U.S. Cl. .................... 308/3 R; 104/93; 105/153; 308/28
[58] Field of Search ................ 105/153; 104/93, 119

[56] References Cited

U.S. PATENT DOCUMENTS 2,920,581  1/1960  Cook et al. ................ 105/153
3,111,910  11/1963  Pao ........................ 104/93

*Primary Examiner*—Richard A. Bertsch
*Attorney, Agent, or Firm*—David A. Boone

[57] ABSTRACT

A carrier is suspended and moves on two shafts. The carrier includes a plurality of sealed roller bearings which form openings approximately equal to the dimensions of the shaft. One or more of the bearings is mounted on a leaf spring to provide a predetermined contact pressure between the bearings and the shaft. In addition, damping elements may be substituted for one or more of the sealed roller bearings to minimize interference from vibrations.

1 Claim, 13 Drawing Figures

SUSPENSION SYSTEM FOR USE WITH HIGH SPEED PRINTERS

BACKGROUND AND SUMMARY OF THE INVENTION

Low friction carrier systems are desirable in printers to allow high speed locating of print heads. In addition, it is desirable to include damping elements to eliminate positioning errors induced by vibrations from operation of the printer motor.

Some previous carrier systems have comprised sleeve bearings which were positioned around supporting shaft and coupled to a carrier. These systems required lubrication of the bar from time to time. This servicing requirements was indesirable since this presented extra maintenance costs and was inconvenient for the user. Sleeve bearing systems of this type require very strict manufacturing tolerances, particularly of the shaft surface, since minor variations either cause a sloppy fit, print errors, or binding of the bearing and shaft.

Other systems have used sealed bearings mounted on pivot arms and held in contact with a supporting bar by helical springs. These systems have the disadvantage that that the pivot arms may require some form of lubrication during the life of the product. Also, the helical springs used are expensive and the tension they provide is not uniform. Assembly procedures for these systems are cumbersome and time consuming. Since the accuracy of carrier registration degrades significantly if the predetermined rigidity is not maintained, all springs used must provide tension in a predetermined range.

The preferred embodiment of the present invention provides a low friction carrier suspension system having optional damping elements. Preload tension of the bearings is provided by a leaf spring coupling one or more of the roller bearings to the carrier. Preload tension is accurately determined by the opening defined by the bearings, and the thickness of the leaf spring material. Different weight carriers which present various inertial loadings can be accommodated by varying the thickness of the leaf spring material.

Some previous printers have attempted to provide damping of unwanted oscillations by electronic circuits coupled to the motor. In the preferred embodiment, mechanical damping elements are mounted on leaf spring material and ensure rapid settling at the target position.

DESCRIPTION OF THE PREFERRED EMBODIMENT

Figure 3A:
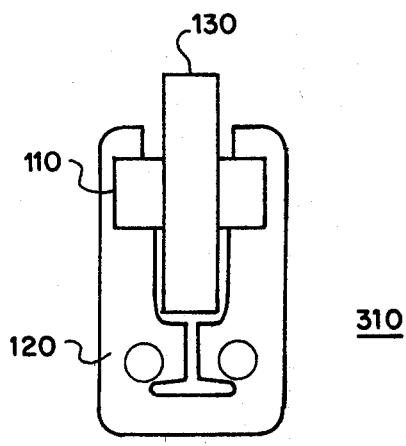
FIG. 3A is a top view and FIG. 3B is a side view of the roller bearing assembly of the preferred embodiment.
Figure 3B:
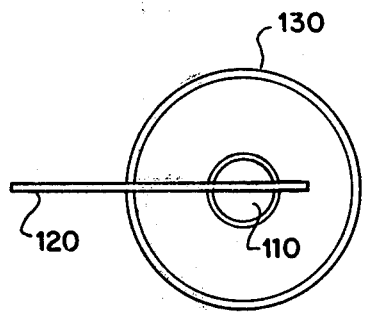

FIGS. 1A-1F show a small shaft 110, a leaf spring 120, and a roller bearing 130. The small shaft 110 has a slot 111 formed in each end. Slots 111 are designed to receive the ends of leaf spring 120 having tabs 122. The roller bearing 130 is press fitted onto the small shaft 110. The tabs 122 of leaf spring 120 are fitted into slots 111. The complete assembly is shown in FIGS. 3A and 3B.

The assembly of shaft 110 and leaf spring 120 is facilitated by a chamfer on ends 122. In addition, an opening 124 in leaf spring 120 allows the ends to move freely until leaf spring 120 is held firmly in place by mounting hardware through mounting holes 126.

Figure 4B:
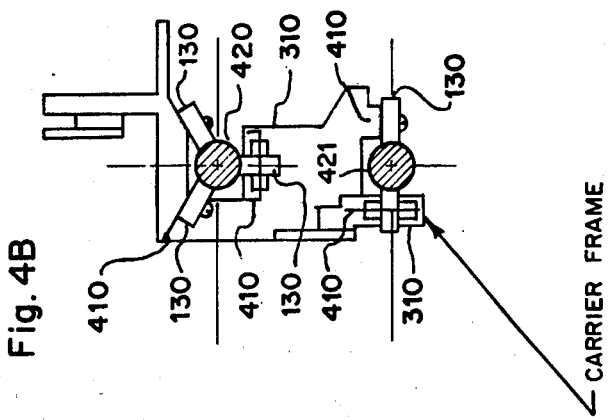
FIG. 4A is a side view and FIG. 4B is an end view of a suspension system in accordance with the preferred embodiment of the present invention.
Figure 4A:
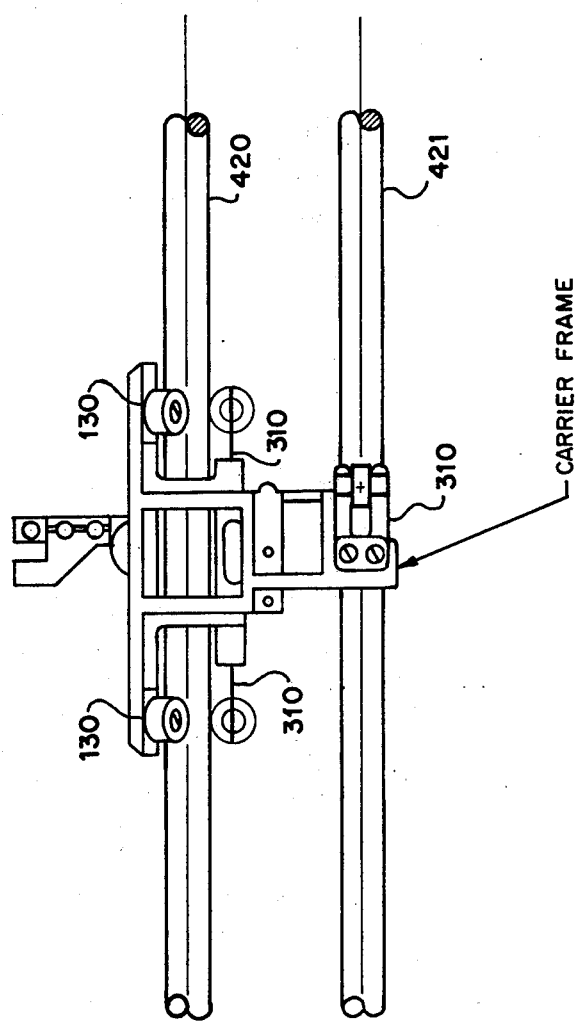

Referring now to FIGS. 4A and 4B there is shown a suspension system for a printer head which uses the above described roller bearing assembly. A carriage assembly 410, only portions of which are shown, is suspended from shafts 420 and 421. Shafts 420 and 421 are coupled to carrier 410 through roller bearings 130. Two of the roller bearings are part of roller bearing assemblies 310, as shown in FIGS. 3A and 3B. Leaf spring 120 of roller bearing assemblies 310 determines the preload tension holding roller bearings 130 in contact with shaft 420.

Figure 1A:
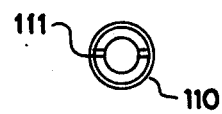
FIGS. 1A-1F show the components of the roller bearing assembly of FIGS. 3A and 3B.
Figure 1B:
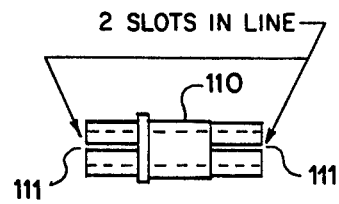
Figure 1C:
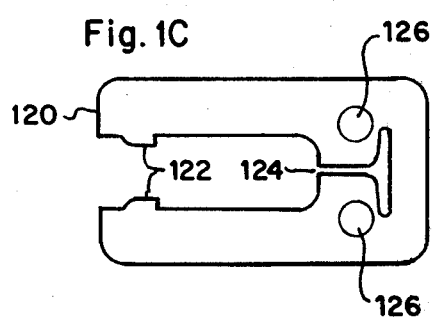
Figure 1D:
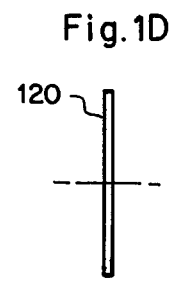
Figure 1E:
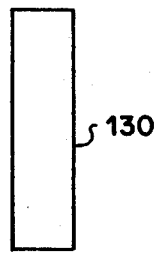
Figure 1F:
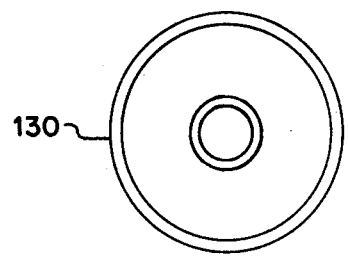
Figure 2A:
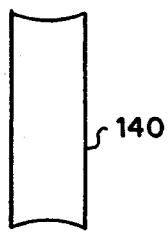
FIGS. 2A and 2B show a suitable shape for a damping element for use in the preferred embodiment.
Figure 2B:
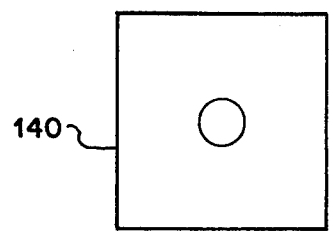

Damping may be provided by replacing one of the roller bearings with a plastic material having a shape as shown in FIGS. 2A and 2B. The material should be selected to have enough friction with the shaft 420 to ensure settling without presenting unnecessary drag on the carrier assembly.

I claim:
1. A suspension system comprising:
   a bar;
   a carrier coupled to the bar and having a plurality of sealed bearings positioned on the carrier to contact the bar, at least one of said sealed bearings being coupled to the carrier by a leaf spring, thereby supplying a predetermined contact pressure between the plurality of sealed bearings and the bar;
   a second bar;
   a second plurality of sealed bearings positioned on the carrier to contact the second bar, at least one of the second plurality of sealed bearings being coupled to the carrier through a leaf spring; and at least one damping element coupled to the carrier and disposed to contact the second bar.

* * * * *

UNITED STATES PATENT AND TRADEMARK OFFICE
CERTIFICATE OF CORRECTION

PATENT NO. : 4,054,330
DATED : October 18, 1977
INVENTOR(S) : Zong S. Luo

It is certified that error appears in the above-identified patent and that said Letters Patent are hereby corrected as shown below:

Column 1, line 16, delete "requirements" and insert -- requirement --;

Column 2, line 15, delete "The" and insert -- Then --.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*